United States Patent [19]

Cheung

[11] 4,399,120
[45] Aug. 16, 1983

[54] HYDROGEN-WATER ISOTOPIC EXCHANGE PROCESS

[75] Inventor: Harry Cheung, Buffalo, N.Y.

[73] Assignee: Union Carbide Corporation, Danbury, Conn.

[21] Appl. No.: 106,738

[22] Filed: Dec. 26, 1979

[51] Int. Cl.³ .............................................. C01B 5/00
[52] U.S. Cl. ................................ 423/648 A; 423/580
[58] Field of Search ............................ 423/648 A, 580

[56] References Cited

U.S. PATENT DOCUMENTS

| | | | |
|---|---|---|---|
| 2,895,803 | 7/1959 | Spevack | 423/580 |
| 3,692,477 | 9/1972 | Thayer | 423/648 A |
| 3,860,698 | 1/1975 | Spevack | 423/580 |
| 3,888,974 | 6/1975 | Stevens | 423/648 |
| 4,054,419 | 10/1977 | Smith et al. | 23/288 A |
| 4,126,667 | 11/1978 | Butler et al. | 423/648 A |
| 4,143,123 | 3/1979 | Butler | 423/580 |

Primary Examiner—O. R. Vertiz
Assistant Examiner—Wayne A. Langel
Attorney, Agent, or Firm—Saul R. Bresch

[57] ABSTRACT

Deuterium is concentrated in a hydrogen-water isotopic exchange process enhanced by the use of catalyst materials in cold and hot tower contacting zones. Water is employed in a closed liquid recirculation loop that includes the cold tower, in which deuterium is concentrated in the water, and the upper portion of the hot tower in which said deuterium is concentrated in the hydrogen stream. Feed water is fed to the lower portion of said hot tower for contact with the circulating hydrogen stream. The feed water does not contact the water in the closed loop. Catalyst employed in the cold tower and the upper portion of the hot tower, preferably higher quality material, is isolated from impurities in the feed water that contacts only the catalyst, preferably of lower quality, in the lower portion of the hot zone. The closed loop water passes from the cold zone to the dehumidification zone, and a portion of said water leaving the upper portion of the hot tower can be passed to the humidification zone and thereafter recycled to said closed loop. Deuterium concentration is enhanced in said catalytic hydrogen-water system while undue retarding of catalyst activity is avoided.

23 Claims, 2 Drawing Figures

HYDROGEN-WATER ISOTOPIC EXCHANGE PROCESS

BACKGROUND OF THE INVENTION

1. Field of the Invention

The invention relates to the exchange of hydrogen isotopes between gaseous hydrogen and liquid water. More particularly, it relates to an enhanced catalytic process for enhancing said exchange and desired deuterium concentration.

2. Description of the Prior Art

Deuterium oxide, or heavy water, is used primarily as a moderator for various nuclear reactor designs. Because of their abundance, natural water sources comprise the major source for such heavy water. Since the natural concentration of deuterium oxide in water is generally only about 0.147 mole percent, extensive concentration of said deuterium is required for practical commercial operations. The initial concentration of deuterium, e.g. in the first and/or second stage of concentration, is found to expend the most energy for separation, and it is such initial concentration to which the invention pertains.

The use of a dual temperature isotope exchange system for heavy water concentration is known in the art as evidenced by the Spevack U.S. Pat. No. 2,895,803, relating to the so-called GS (Girdler-Sulfide) process. Two serially arranged gas-liquid contacting towers are employed in this process, one operating at about 130° C. and 300 psia. A feedwater stream passes sequentially through the cold tower, a dehumidification section, the hot tower and a humidification section countercurrent to an upwardly flowing stream of hydrogen sulfide gas therein. The water is progressively enriched in deuterium as it flows downwardly through the hot tower. Conversely, the hydrogen sulfide stream is enriched in deuterium as it passes upwardly in the hot tower and is depleted therein as it passes upwardly through the cold tower. The concentration of deuterium in each stream is maximized between the hot and cold towers. In the conventional GS process, a portion of the enriched water and gas between the towers is withdrawn for further processing in order to further concentrate the heavy water product. Water is discharged to waste from the bottom of the hot tower, while the hydrogen sulfide is continuously recycled through essentially a closed loop circulation path.

Various improvements have been made to the basic GS process over the years, particularly as disclosed in the Spevack patent, U.S. Pat. No. 3,860,698. This modification utilizes the closed-cycle circulation not only of the gaseous hydrogen sulfide exchange fluid, but also of a portion of the liquid feed water contacted therewith. Thus, water is feed from a source of supply to a hot tower feed section for contact against an upwardly flowing hydrogen sulfide gas stream, with said feed water being restricted solely to said hot tower in which it becomes depleted in the desired isotope, deuterium, as it flows downward therein, while the upwardly flowing hydrogen sulfide gas becomes enriched in the deuterium isotope. The remaining portions of the contacting system are serviced by an essentially closed liquid water recirculation loop. The closed loop water, after cooling, enters the top of the cold tower and descends downwardly therein for contact against the upwardly flowing hydrogen sulfide gas stream that becomes enriched with the desired deuterium isotope. Upon leaving the cold tower, the water enriched in deuterium enters the top of a dehumidifying section that serves to remove water vapor from, and to cool, the upwardly flowing hydrogen sulfide gas stream entering said section from the hot tower. The liquid water is, in turn, heated therein so that its temperature is elevated sufficiently for it to be subsequently fed to the top section of the hot tower. If desired, a portion of this heated water is withdrawn and fed to the second concentration stage, while another portion is subjected to several stages of heat exchange to appropriately cool the liquid for its use as additional heat exchange fluid for the cooling of the hydrogen sulfide gas stream in the dehumidifying section.

In this modification of the GS process, the previously heated liquid water fed to the top section of the hot tower passes downwardly therein countercurrently against the upwardly flowing hydrogen sulfide gas stream in said portion of the hot tower. At its elevated temperature, the liquid water becomes depleted in the isotope deuterium, while the hydrogen sulfide becomes enriched in this isotope. The hot liquid water withdrawn from the bottom of the hot tower top section is divided into three streams. The first, major portion of the water is withdrawn, cooled in a heat exchange zone, and fed to the top of the cold tower, i.e. recycled in the closed liquid loop. The second portion of the hot liquid is withdrawn and fed to the top of a hot tower recycle section for further contacting with an upwardly flowing hydrogen sulfide gas stream. A third, minor portion of the hot liquid water is fed to the top of the hot tower feed section to ensure that any feed water entrained in the upwardly flowing gas stream within said hot water feed section is not carried thereby into the top section of the hot tower. The hot liquid water contacted against the upwardly flowing hydrogen sulfide gas in the hot tower recycle section is further depleted in the desired isotope and is withdrawn from the section and fed to a humidifying section. In the embodiment of FIG. 2 of said U.S. Pat. No. 3,860,698, the hot tower recycle section is not employed and, assumably, one portion of the liquid water from the hot tower top section would be fed directly to the humidifying section, which is used to prepare the cold hydrogen sulfide gas stream recirculated from the top of the cold tower with appropriate heating and humidification for subsequent feeding to the bottom of the hot tower feed section. A portion of the heated and humidified hydrogen sulfide gas stream is fed to the bottom of the hot tower recycle section, if employed. The cooled liquid water withdrawn from the bottom of the humidifying section is recycled through an appropriate heat exchange zone, for further cooling, to the top of the cold tower.

The Spevack U.S. Pat. No. 3,860,698, discloses the essentially complete separation of the feed water from the remaining liquid water used in the process. Mixing occurs only through the indicated use of a small portion of the hot liquid withdrawn from the bottom of the hot tower top section for the desired suppression of entrained liquid in the hot tower feed section. The patent indicates that the modified GS process disclosed therein has particular utility when the feed water constitutes a highly corrosive material such as sea water. In the practice of the modified process, expensive materials of construction need only be used because of feed water corrosion in the hot tower feed section. The patent also indicates that the process is particularly useful when there is a limited supply, or a high cost supply of feed substances.

Regardless of the usefulness of the basic GS process and of the improvements therein disclosed by Spevack, inherent drawbacks exist in the water-hydrogen sulfide process that can not be avoided. For instance, hydrogen sulfide is a very poisonous gas that requires extraordinary care and safety precautions in its handling. In addition, the hydrogen sulfide, in combination with materials present in the feed water, creates serious corrosion and foaming problems. The corrosion problem can only be overcome by employing more expensive materials of construction. The foaming problem is typically handled by the addition of various chemical antifoam agents to the water, although expensive pretreatment operations can also minimize the foaming problem. In addition, pollution problems are caused by the hydrogen sulfide, since it is dissolved in the wastewater along with any chemical agents employed to combat said foaming problem. As a result, expensive post-treatment operations are also necessary as part of the overall deuterium concentration operation.

The water-hydrogen sulfide isotopic exchange process is also subject to significant physical constraints. The upper pressure limit of this system is limited to about 300 psia because of the possibility of hydrogen sulfide condensation in the cold tower. Additionally, the hot tower temperature is also somewhat constrained because of the excessive humidification and dehumidification requirements accompanying high temperature operation at the limiting pressure. The cold tower operating temperature is limited by the formation of ice and hydrogen sulfide solid hydrate. Both tower limits thereby fix the temperature difference between the towers, and thus limit the theoretical degree of separation obtainable in the isotopic exchange process. Such physical bounds on temperature and pressure, taken together, limit the theoretical productivity of the GS process. When these limitations are coupled with the relatively low equilibrium constant of the hydrogen sulfide-water exchange reaction, it will be seen that drawbacks exist in the commercial concentration of deuterium for heavy water production by means of the GS process. This process has nevertheless been employed in commercial operations because the alternative routes to heavy water production have been even more expensive or less efficient than the GS process.

In an effort to overcome such inherent limitations or problems in the established commercial practice for deuterium concentration, considerable attention has been given to the hydrogen-water isotopic exchange for deuterium concentration and heavy water production, since the equilibrium constant for such exchange is significantly higher than for the hydrogen sulfide-water exchange from the GS process. In the hydrogen-water exchange system, the isotopic exchange proceeds according to a two-step reaction process in which the following reactions occur simultaneously:

$$HD + H_2O_{(g)} \rightarrow H_2 + HDO_{(g)}, \quad (1)$$

and

$$HDO_{(g)} + H_2O_{(\ell)} \rightarrow H_2O_{(g)} + HDO_{(\ell)} \quad (2)$$

Under normal conditions, however, the rate of exchange reaction (1) of this two-step process is excessively low, and, as such, creates a major obstacle to the commercialization of the process. Efforts have been made, therefore, to develop suitable materials for catalyzing said reaction (1), as well as means for extending the lifetime of useful catalysts for effective service in commercial deuterium concentration operations. Catalyst materials heretofore found potentially useful for such operations are extremely sensitive, however, to fouling by flooding with water used in the hydrogen-water isotopic exchange system. As a result, extremely complicated process designs were initially proposed for the use of such catalysts in hydrogen-water systems. Such processes commonly would require that a portion of the water, as vapor, be repeatedly superheated, contacted with the hydrogen in the presence of the catalyst to enrich the deuterium concentration, and then contacted with liquid water to effect a transfer of the deuterium to the liquid phase. Such processing would be exceedingly energy intensive, and catalyst fouling would remain as a significant problem. More recently, attempts have been made to produce hydrophobic catalysts useful for the hydrogen-water exchange so that the catalyst system need not be physically isolated from the stream of liquid water, while catalyst fouling could nevertheless be retarded or effectively avoided.

One approach for the providing of a hydrophobic catalyst system for enhancing the isotopic exchange reaction between hydrogen and water utilizes a porous catalytic support structure, e.g. alumina or charcoal, upon which a catalytic material selected from the Group VIII metals is deposited, with a water-proof coating provided over the entire sub-structure by a silicone resin or a film of polytetrafluoroethylene. The coating ensures that the catalytic material is accessible to the hydrogen gas as required for the isotopic exchange of reaction (1) above, but is substantially inaccessible to liquid water, i.e. the catalyst is waterproof, to avoid fouling of the catalyst by the water in the hydrogen-water system. Such a hydrophobic catalytic system is described in the Stevens U.S. Pat. No. 3,888,974.

A catalyst system that can be so employed without the need for physical isolation thereof from the stream of liquid water is the Moxy System of The Mead Corporation. This System, which has important and wide application, serves to promote chemical reactions and/or mass transfer between entities comprising or contained in fluids, wherein either (1) solid material porous on at least a molecular scale or (2) one or more solid heterogenous, porous or non-porous, catalysts operate in a medium of at least two immiscible fluid phase, the surface of such solid material or catalyst being treated so that part is wetted by one fluid phase and part by another immiscible fluid phase, thereby ensuring that respective portions of such solid material or catalyst are directly in contact with one or the other of the immiscible fluid phase, and wherein such entities are in contact with each other and with such solid material or catalyst. Further information concerning the Mead Moxy System can be found in Smith et al, U.S. Pat. No. 4,054,419, and Canadian Patents Nos. 944,535 and 959,821, all of which relate generally to reduction-oxidation processes and apparatus utilizing in the preferred form a particulate carbon discontinuously coated with polytetrafluoroethylene.

Another means of assuring a waterproof or hydrophobic catalyst for the desired isotopic exchange was disclosed by Rolston et al, U.S. Pat. No. 4,025,560, in which the waterproofing or hydrophobic material, with polytetrafluoroethylene or carbon black being disclosed, serves as the support structure for the catalytic material that is selected from the Group VIII elements and is deposited directly on the hydrophobic support. Butler et al, U.S. Pat. No. 4,126,667, describes a packed tower system in which a catalytic material having a permeable coating is interspersed with a non-catalytic packing material provided with a hydrophilic coating. Butler et al, U.S. Pat. No. 4,143,123, describes still another catalytic system in which partially platinized carbon particles are dispersed in a polytetrafluoroethylene matrix in a weight ratio of 1:1 to 3:1 of polytetrafluoroethylene: partially platinized carbon particles. The inherently hydrophobic, porous tetrafluoroethylene matrix purportedly allows the platinum to catalyze the exchange reaction in the presence of liquid water while retarding catalytic fouling.

Catalytic systems are thus available that would serve to enhance the commercial feasibility of employing a hydrogen-water system for deuterium concentration purposes. Such systems have commonly been taught as being disposed as a packed column or bed. The packing may comprise discrete bodies of the catalytic material or, alternatively, the bodies of catalytic material may themselves be supported on a distinct packing material, such as well-known Raschig rings, Lessing rings, or Berl saddles, with either co-current or countercurrent flow of liquid and gas through the packed column. It has also been proposed to use water soluble materials to catalyze the hydrogen-water exchange reaction. Mills, U.S. Pat. No. 2,967,089, thus discloses a homogeneous system for the low temperature isotopic exchange. Hydrogen and water are contacted in the presence of a solution of a complex cobalt-cyanide salt of an alkali metal containing the cobalt in a mono-valent or di-valent state. It has further been proposed that a heterogeneous catalyst be employed in the form of a solid-liquid suspension in water under high pressure. E. W. Becker et al, "Enrichment of Heavy Water by High-Pressure Exchange Between Hydrogen and an Aqueous Suspension of a Catalyst", *Proceedings of the Second United Nations International Conference on the Peaceful Use of Atomic Energy*, Volume 4: Production of Nuclear Materials and Isotopes, United Nations Publications 1958, pp. 543–549, disclose such a suspension in a system employing an entirely closed liquid loop. This approach, in which hydrogen gas provides the isotope source and in which platinized activated charcoal was disclosed as the catalyst, requires a large amount of hydrogen to drive the process.

In the hydrogen-water exchange for deuterium concentration, it will be seen that the use of hydrophobic coatings on the exchange catalyst is well known in the art. While such coatings serve to lengthen the useful lifetime of the catalyst by preventing rapid fouling by liquid water, other problems are found to exist in such isotopic exchange processing that also tend to limit catalyst lifetime. For example, catalyst poisons, such as scale forming compounds, present in the feed water will tend to slowly retard catalyst activity. Expensive feed pretreatment is needed to minimize this problem. In addition, catalyst attrition with the waste water stream, resulting from catalyst erosion, must be countered by expensive post treatment practices. While the slurry approach described by Becker et al, as referred to above, provides a potential solution to these problems, the need for a large supply source of hydrogen therefor is a major drawback that cannot be avoided in the slurry approach.

It is an object of the invention, therefore, to provide an improved hydrogen-water isotopic exchange process for deuterium concentration.

It is another object of the invention to provide a dual temperature, hydrogen-water exchange process having productivity limits significantly in excess of those of the GS hydrogen sulfide-water exchange process.

It is another object of the invention to provide a dual temperature, isotopic exchange process in which a catalyst can be effectively employed to increase the rate of hydrogen-water exchange without undue fouling by said water.

It is another object of the invention to provide a process of isotopic exchange employing a hydrogen-water system with increased deuterium recovery from a feed stream relative to the GS process for hydrogen sulfide-water exchange without increase in the quantity of feed substance processed.

It is a further object of the invention to provide a dual temperature, hydrogen-water isotopic exchange process in which a valuable catalyst can be used for long periods of operation without excessive deactivation or attrition.

It is a further object of the invention to provide a dual temperature isotopic exchange process for deuterium concentration in which valuable catalyst material is protected from feed water impurities tending to retard catalyst activity.

With these and other objects in mind, the invention is hereinafter described in detail, the novel features of which are pointed out in the appended claims.

SUMMARY OF THE INVENTION

The objects of the invention are achieved by a dual temperature isotopic exchange process employing hydrogen-water exchange with water passing in a closed recirculation loop between a catalyst-containing cold tower and the upper portion of a catalyst-containing hot tower, with feed water being introduced to the lower portion of the hot tower and being maintained out of contact with the water recirculating in said closed loop. Undue retarding of catalyst activity during deuterium concentration can thus be avoided. The cold tower and the upper portion of the hot tower can be operated with relatively expensive catalyst material of higher catalyst activity, while the lower portion of the hot tower can be operated with a relatively less expensive, more rugged catalyst material of lesser catalyst activity. The feed water stream, being restricted solely to the lower portion of the hot tower, requires minimal pretreatment for the removal of potential catalyst contaminants since said feed water does not come into contact with the more expensive, more efficient catalyst employed in the cold tower and the upper portion of the hot tower. The catalyst materials are desirably coated with a hydrophobic treating material so as to be substantially inaccessible to liquid water, thereby appreciatly retarding catalyst fouling thereby, while being accessible to the gas for enhancing isotopic exchange between hydrogen gas and water vapor. A portion of the water of the closed loop can be passed to a humidification zone to heat and humidify the circulating hydrogen gas and then returned to the closed loop in one of the processing modifications feasible for enhancing the rate of hydrogen-water isotopic exchange and the desired deuterium exchange.

BRIEF DESCRIPTION OF THE DRAWINGS

The invention is further described herein with reference to the accompanying drawings in which.

DETAILED DESCRIPTION OF THE INVENTION

The invention enables the hydrogen-water exchange, which has a significantly higher equilibrium constant than that pertaining to a hydrogen sulfide-water exchange, to be effectively employed in a dual temperature process for deuterium concentration at desirable rates while avoiding undue retarding of catalyst activity. The invention thus provides a convenient and highly desirable means for overcoming the major obstacles to the commercialization of the hydrogen-water isotopic exchange process. The invention also minimizes the amount of feed water pretreatment required, further enhancing the overall technical-economic feasibility of employing the hydrogen-water exchange in commercial deuterium concentration operations for heavy water production. The improved hydrogen-water isotopic exchange process of the invention thus enables significantly higher recovery of deuterium to be achieved vis-a-vis the established hydrogen sulfide-water exchange system without increase in the quantity of feed water processed. The undesirable features of the use of hydrogen sulfide gas in said dual temperature, isotopic exchange processing are entirely avoided. The problems of catalyst attrition and excessive deactivation are minimized in the practice of the invention, enabling valuable catalyst material to be more effectively and efficiently employed, further enhancing the overall dual temperature, hydrogen-water exchange for practical commercial deuterium concentration and heavy water production.

The dual temprature isotopic exchange process of the invention achieves the desired production of a deuterium-enriched fluid stream at rates of isotope exchange enhanced by the presence of suitable catalyst material protected from undue retarding of catalyst activity and catalyst lifetime by the isolation of the catalyst in the cold tower and in the upper portion of the hot tower from impurities in the feed water. Thus, the feed water is introduced into the top of the lower portion of the hot tower and does not contact the water employed in the cold tower and the upper portion of the hot tower as a closed liquid recirculation loop. In preferred embodiments of the invention, a catalyst material of higher catalytic activity is employed in said cold tower and said upper portion of the hot tower, with a catalyst material of lower quality being employed in the lower portion of the hot tower. Only lower quality catalyst material thus contacts the feed water stream. As in hereinafter described, such preferred embodiments provide an optimum balance between isotope exchange productivity and cost enhancing the overall technical and economic feasibility of the hydrogen-water exchange system for deuterium concentration and heavy water production.

Figure 1:
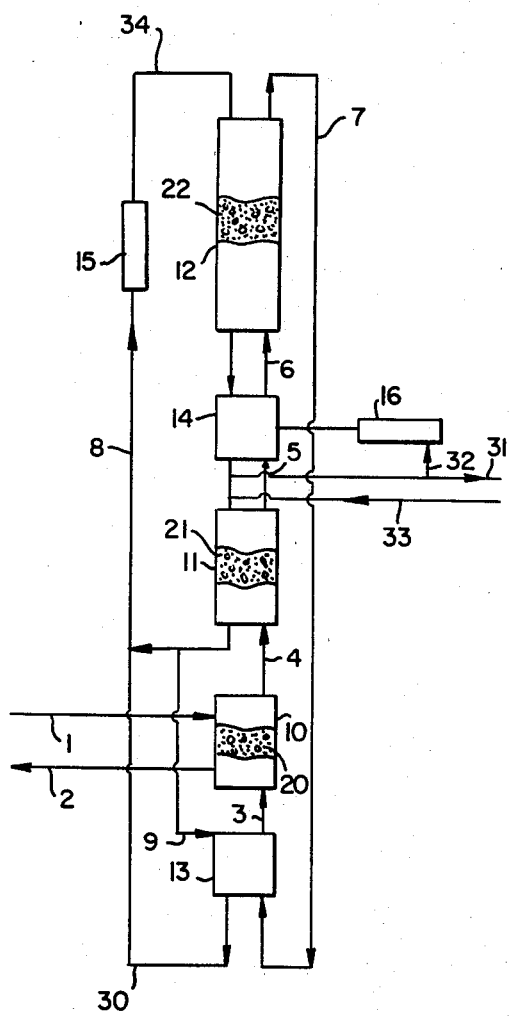
FIG. 1 is a simplified process flow diagram of an embodiment of the dual temperature, isotopic hydrogen-water exchange process of the invention.

Referring to the embodiment of the invention illustrated in FIG. 1 of the drawings, a feed stream of liquid water that does not require expensive pretreatment to remove catalytic fouling agents is passed through conduit 1 to lower portion 10 of the hot tower contacting zone or section of a dual temperature isotopic exchange system. Said lower portion 10 comprises a packed bed containing particles 20 impregnated with a suitable catalytic agent. The feed water thus introduced to lower portion 10 of the hot water is contacted against an upwardly flowing hydrogen gas stream that is introduced into the bottom of said lower portion 10 of the hot tower through conduit 3. In this lower portion 10, the liquid water becomes depleted in the deuterium isotope being concentrated, while the hydrogen gas becomes enriched in said isotope. Deuterium-depleted water is withdrawn from lower portion 10 of the hot tower at the bottom part thereof through conduit 2. After treatment to recover any useful energy therefrom as desired, the deuterium-depleted water can be discharged to waste or otherwise used outside the subject deuterium-concentration process.

The hydrogen gas exiting from said lower portion 10 of the hot tower through conduit 4, now enriched in the deuterium isotope, is further contacted in upper portion 11 of the hot tower contacting zone against a downwardly flowing water stream. Said upper portion 11 of the hot tower is also a packed bed tower in which a catalytic agent is deposited or impregnated on the tower packing 21. As the hydrogen gas passes upwardly through this portion of the hot tower, it becomes further enriched in the deuterium isotope. Conversely, the water flowing downwardly through said upper portion 11 of the hot tower becomes depleted in the deuterium isotope. The hydrogen gas exits from said upper portion 11 through conduit 5 and passes into dehumidification zone 14 wherein water vapor inherent therein is removed, as for example by direct contact cooling. The cooled and dehumidified gas exiting from said zone 14 through conduit 6 then passes into the lower portion of cold tower contacting zone or section 12 for upward flow therein. The cold tower also comprises a packed bed tower with the catalyst agent deposited or impregnated on the packing 22. In this cold tower contacting zone 12, the upwardly flowing hydrogen gas becomes depleted in the deuterium isotope. The gas then exits from the cold tower through conduit 7 and is recirculated for further upward passage through the two portions of the hot tower, the dehumidification zone and the cold tower as described above. Prior to entering the bottom portion of the hot tower, the recirculated hydrogen from the cold tower passes in conduit 7 to humidification zone 13 in which it is heated and humidified by direct contact with water as hereinafter described. The humidified and heated hydrogen gas is passed through conduit 3 into lower portion 10 of the hot tower for upward passage as previously indicated.

The liquid water flowing out of the bottom of upper portion 11 of the hot tower passes, in a closed liquid recirculation loop, downwardly through cold tower 12, dehumidification zone 14, and upper portion 11 of the hot tower, exiting therefrom through conduit 8 for recirculation in said closed loop. In the illustrated embodiment, the liquid in conduit 8 is cooled in heat exchanger 15 prior to being fed to the top of cold tower contacting zone 12 through conduit 34. As the liquid water passes downwardly through the cold tower, it becomes enriched in the deuterium isotope. This water exiting the bottom of the cold tower is used to cool and dehumidify the upwardly flowing hydrogen gas stream in dehumidification zone 14. The water exiting from the bottom of zone 14 passes to the upper portion 11 of the hot tower in said closed liquid recirculation loop as described above, with a portion of the deuterium-enriched liquid exiting from the dehumidification zone nevertheless being withdrawn through conduit 31 for further downstream treatment and enrichment of the deuterium isotope and heavy water production. A portion of said withdrawn liquid in conduit 31 may, however, be diverted in conduit 32 to heat exchange zone 16 and thereafter fed back into dehumidification zone 14 to ensure proper cooling and dehumidification of the upwardly flowing hydrogen gas stream therein. Liquid from downstream separation stages is returned to the closed loop through conduit 33. In the illustrated embodiment, liquid is also withdrawn from the closed loop by withdrawing in conduit 9 a portion of the water exiting from upper portion 11 of the hot tower through conduit 8. This withdrawn water is fed in conduit 9 to humidification zone 13 where it is used to heat and humidify the circulating hydrogen gas stream. Water that is not vaporized in humidification zone 13 is returned to the closed liquid loop through conduit 30.

The cold and hot towers contain suitable catalysts for enhancing the desired hydrogen-water isotopic exchange because of the relatively low exchange rate constant of the isotopic exchange reactions involved in the absence of such catalysts. For this same reason, the gas-liquid contacting carried out in the humidification and dehumidification zones does not unduly disturb the concentration gradient established throughout the contacting sections or zones because of the absence of catalytic agent therein. As a result, little or no isotope exchange occurs either in the humidification zones.

Figure 2:
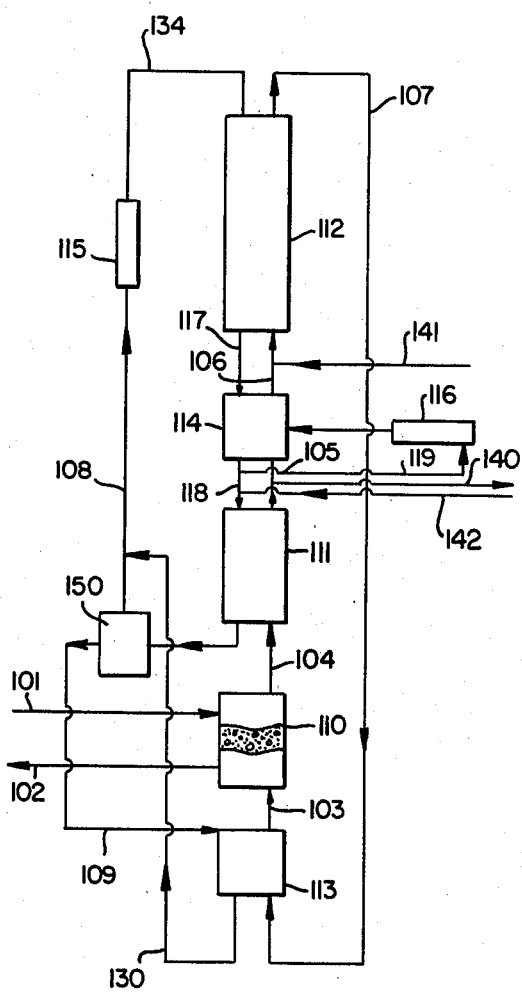
FIG. 2 is a similar process flow diagram of an embodiment of said invention in which deuterium-enriched product is fed to downstream processing units via the circulating hydrogen gas stream and colloidal-sized particles are employed in slurry form with the closed loop liquid.

Another embodiment of the invention is illustrated in FIG. 2 showing the feeding of the deuterium-enriched product to downstream processing units via the circulating hydrogen gas stream. Another feature of the illustrated embodiment is that the exchange catalyst serving the closed liquid loop is employed as colloidal-size particles and forms a slurry with the closed loop liquid. Referring specifically to this drawing, a feed water stream 101 is fed to the top portion of lower hot tower contacting zone or section 110 for flow downward therein countercurrently to an upwardly flowing hydrogen gas stream. Said zone 110 contains a packed bed of catalytically active material in which the catalytic agent is supported on a porous support media. In this hot zone, the deuterium isotope contained in the feed water stream is preferentially transferred to the upwardly flowing hydrogen gas stream. As a result, the concentration of deuterium in the water stream discharged from the contacting zone 110 through conduit 102 is lower than in the feed water and can be discharged to waste following heat exchange, if desired, or used for purposes outside the scope of the invention.

The hydrogen gas stream, somewhat enriched in the deuterium isotope is discharged from said lower zone 110 through conduit 104 and passes to the upper portion 111 of the hot tower. Therein, the hydrogen gas stream is further enriched with the deuterium isotope, the further-enriched hydrogen stream is discharged from the top of said upper portion 111 through conduit 105. A portion of this deuterium-enriched hydrogen gas stream is removed through conduit 140 for downstream processing to remove and concentrate the deuterium isotope in conventional equipment and in a manner well known in the art. A stream of water 142, equivalent in mass flow to the quantity of water vapor withdrawn through conduit 140, is returned to the process and flows in the closed liquid loop. In a similar fashion, a stream of hydrogen-containing gas, which is enriched in the deuterium isotope and equal in mass flow to the withdrawn stream in conduit 140 for downstream processing, is returned to the upwardly flowing hydrogen gas stream entering the bottom of the cold tower contacting section or zone 112 through conduit 141.

The hydrogen gas stream leaving the hot tower through conduit 105, apart from that removed in conduit 140, is first cooled and dehumidified in dehumidification zone 114, which may conveniently be constructed as a direct contact dehumidifier receiving the necessary cooling water stream from the cold water exiting from cold tower contacting zone 112 through line 117. In addition, a portion of the liquid stream removed from dehumidification zone 114 in line 118 is recycled through cooler 116 by means of line 119 and returned to said cold tower 112. Other commonly available procedures for cooling and dehumidifying the hydrogen gas stream can also be employed.

In cold tower contacting zone 112, the upwardly flowing hydrogen gas stream transfers its share of the deuterium isotope to the downwardly flowing liquid water stream comprising the closed loop liquid. This water stream enters the cold tower through conduit 134. A deuterium-depleted hydrogen gas stream is withdrawn from the top of cold tower 112 through conduit 107 and is recirculated therein to the humidification zone 113 where it is heated and humidified by water diverted from the closed liquid loop. The closed loop water used in the humidification zone 113 is taken from the water withdrawn from upper portion 111 of the hot tower and is passed to said zone 113 by means of conduit 109. Another portion of the water withdrawm from upper portion 111 of the hot tower is recycled through conduit 108 to heat exchanger 115 for cooling with subsequent passage of the cooled water in conduit 134 to the top of cold tower 112.

As shown in FIG. 2, the closed loop fluid leaving the bottom of upper portion 111 of the hot tower in line 20 is first processed in separator 150 where the closed loop water is desirably separated from any colloidal-sized catalyst particles that may be present therein. This separation assures that essentially no catalyst material is passed into humidification zone 113. The presence of catalyst material is generally undesired in said zone 113 as it would tend to disrupt somewhat the concentration gradients in the exchange system and thus disrupt the degree of separation that occurs in lower portion 110 of the hot tower contacting zone. Since the quantity of water being passed to the humidification zone is relatively small, however, the amount of catalyst that would be carried over with the water flowing to zone 113 through conduit 109 with nevertheless have only a minor effect on the overall deuterium production operation in any event. Any excess water from the humidification zone 113 is conveniently returned to the water in closed loop conduit 108 through conduit 130.

In the practice of the present invention, the cold tower contacting zone and the upper portion of the hot tower contacting zone preferably contain a highly active, and correspondingly relatively expensive, catalyst material for enhancing the deuterium exchange reaction occurring therein. The lower portion of the hot tower, on the other hand, preferably contains a less active, and correspondingly less expensive catalyst material, that is generally more hardy or rugged than the material in the cold tower and upper portion of the hot tower. In this preferred arrangement, the more active catalyst material that is more easily prone to fouling contacts only the closed liquid loop water that can be easily maintained free of catalyst fouling agents. The closed loop water flow pattern has furthermore been found to minimize the effect of any attrition of the catalyst material. Conversely, the use of the more rugged catalysts in the lower portion of the hot tower contacting zone is found to obviate the need for the treatment of the feed water introduced to the lower portion of the hot tower that would be otherwise required if the more highly active, less rugged catalyst material were employed therein. In addition, it should be noted that the higher operating temperature of the hot tower increases the isotopic exchange rate so that the lower catalytic activity of the catalyst employed in the lower portion thereof is somewhat offset. Those skilled in the art will appreciate, therefore, that the preferred embodiments using both more active and less active catalyst materials provide an optimum balance of deuterium productivity and expense in the practice of the hydrogen-water isotopic exchange process of the invention. The technical and economic feasibility of such exchange system for deuterium concentration and resultant heavy water production is thereby enhanced, and the desired object of achieving long periods of dual temperature, isotopic exchange operations without excessive catalyst deactivation or attrition is readily achieved.

The cold tower contacting zone and the upper portion of the hot tower are desirably operated with a relatively expensive and highly effective catalyst selected from the group of catalyst materials consisting of platinum and palladium. The lower portion of the hot tower contacting zone are desirably operated with a relatively more rugged and less effective catalyst taken from the group consisting of nickel, iron, cobalt and chromium. It will be understood that, in its proudest aspects, the invention may incorporate any suitable material that has a catalyzing effect on the hydrogen-water exchange system in the cold and hot tower sections of the process.

As the catalyst materials thus far found useful for the isotopic exchange purposes of the invention are extremely sensitive to fouling with water, the catalyst employed in both the cold tower and the upper portion of the hot tower, which contacts the closed loop water, and in the lower portion of the hot tower, which contacts the feed water that supplies the necessary deuterium isotope to the system, is rendered substantially hydrophobic by techniques known and available in the art. Thus, the catalyst materials are advantageously and preferably employed in hydrophobic or waterproofed catalytic systems in which the catalyst materials are accessible to the gas for isotopic exchange between hydrogen and water vapor, but are substantially inaccessible to liquid water. For this purpose, the catalyst is treated with, for example, polyetrafluoroethylene, a silicon resin or other suitable hydrophobic treating material as for example, in the systems referred to in the background section above. It will be understood by those skilled in the art that such hydrophobic catalyst system may comprise the catalyst material, a porous catalyst support structure, such as alumina, charcoal, carbon black or the like, and a hydrophobic treating or coating material. One such system is the Mead "Moxy" system in which the catalyst is supported on an appropriate material and coated with a porous layer of polytetrafluoroethylene.

Various alternatives can be employed with respect to the catalyst material and system employed in the practice of the invention without departing from the scope thereof. Thus, it is possible to use the catalyst materials or higher quality in the lower portion of the hot zone, but with a lesser quantity of catalyst material required per unit weight of catalyst system. Similarly, the less active catalyst material can be employed in the cold tower and in the upper portion of the hot tower although such an arrangement is not generally preferred for the reasons set forth herein. The quantity of catalyst material employed is typically in the range of from about 0.1 to about 5% by weight based on the weight of the overall catalyst system for the higher quality catalyst material. The weight of the less active catalyst material, on the other hand, is typically on the order of from about 1% to about 50% by weight based on the overall weight of the catalyst system. In those instances where the higher quality catalyst is employed in catalyst systems for use in the lower portion of the hot tower, the weight of catalyst material per unit weight of catalyst system should not generally exceed about 1% by weight of said system.

The catalyst systems comprising catalyst material, support material and hydrophobic treating material can readily be employed in packed bed form or can be supported in a known manner on spaced-apart gas-liquid contacting trays in said cold and hot contacting towers. In another embodiment, the catalyst material employed in the cold tower and in the upper portion of the hot tower can be employed as colloidal size particles that form a slurry with the water circulating in the closed liquid loop. In another embodiment, the catalyst material in said cold tower and the upper portion of the hot tower can comprise a water soluble, homogeneous material that likewise circulates with the water in the closed loop. In all such embodiments, it will be appreciated that the water in the closed loop, and the catalyst associated therewith, are effectively isolated from contact with the feed water introduced into the lower portion of the hot tower and from the impurities present in the feed water.

It will be appreciated that the temperature and pressure conditions employed in the practice of the invention can be any known, suitable conditions permitting the hydrogen-water exchange with the cold tower at such relatively cold conditions as to effect enrichment of the water and with the hot tower at relatively hot conditions such as to effect enrichment of the hydrogen in the deuterium isotope that is the subject of the catalytic isotopic exchange system. The temperature of the cold tower is limited to greater than 0° C. due to ice formation and is preferably operated at about 30° C. The hot tower is preferably operated at about 150° C. with an upper limit of about 200° C. dictated by the onset of excessive vaporization demands. The hydrogen-water system of the invention can be operated at pressures generally in the range of from about 300 to about 3,000 psia, with operation preferably being at from about 300 to about 1,000 psia. In an illustrative example of the practice of the invention, a hydrophobic, platinized activated carbon catalyst system is employed in a packed bed in the cold tower and in the upper portion of the hot tower, being contacted therein by water circulating in the closed loop as shown in FIG. 1 of the drawings. A less active chromium coated alumina is employed in the lower portion of the hot tower, being contacted therein by untreated feed water introduced into said lower portion, but effectively isolated from the water in the closed loop. The less active catalyst like the more active platinum catalyst system is rendered hydrophobic by a coating of polytetrafluoroethylene without complete encapsulation of the catalyst with the hydrophobic material and without encapsulation of the hydrophobic material with the catalyst, each catalyst system comprising examples of said Mead "Moxy" system. The catalyst material of higher quality is employed in an amount of about 1% by weight of the overall catalyst system, while the lesser quality catalyst is employed in an amount of about 5% by weight of the overall catalyst system. A portion of the closed loop water is diverted to the humidification zone, i.e. zone 13 in said FIG. 1, with excess water being returned to the closed loop as shown in said drawing. In this dual temperature, hydrogen-water system, continuous operations are carried out without excessive attrition or deactivation of catalyst material that serves effectively to increase the rate of hydrogen-water exchange. At the cold temperature and elevated pressure in the cold tower, deuterium is concentrated in the water in the closed loop, while deuterium is concentrated at elevated pressure and temperature, i.e. hot temperatures, in the hot tower. Concentration of deuterium is thus enhanced. A deuterium enriched steam is withdrawn as product from between the hot and cold contacting towers, i.e. product heavy water is removed from the exchange system with a portion of the hydrogen gas flowing between the hot tower and the dehumidification zone.

The dual temperature, hydrogen-water exchange system of the invention enables productivity of concentrated deuterium to significantly exceed that obtainable in the conventional hydrogen sulfide-water system. Such results are achieved by the use of effective catalyst systems serving to significantly enhance the rate of exchange reaction (1) above that otherwise would hinder successful use of the hydrogen-water system for commercial applications. In rendering practical the hydrogen-water exchange process, the invention obviates the various disadvantages associated with the use of hydrogen sulfide in accordance with established practice. By enabling the catalyst to be employed without excessive deactivation or attrition in long term use and without the need for expensive pretreatment of the feed water, the invention enhances the practical feasibility of deuterium concentration by the subject catalytic exchange process. Through the combination of such features, the invention represents an important practical advance in the field of heavy water production and thus constitutes a significant contribution in the overall field of nuclear processing.

What is claimed is:

1. A dual temperature isotopic exchange process for the production of a deuterium-enriched fluid stream selected from the group consisting of water and hydrogen comprising:
(a) passing, on a cyclic basis, a gaseous hydrogen stream containing said deuterium isotope (1) upwardly through a lower portion of a hot tower contacting zone, (2) upwardly therefrom through the upper portion of said hot tower, said tower having means to prevent the flow of liquid between said upper and lower portions thereof, (3) upwardly therefrom through a cold tower contacting zone, and (4) therefrom recirculating said gaseous hydrogen stream to said lower portion of the hot tower, said cold tower and upper portion of the hot tower each having therein a catalyst system wherein the catalyst consists essentially of a metal selected from the group consisting of platinum and palladium and said lower portion of the hot tower having therein a catalyst system wherein the catalyst consists essentially of a metal selected from the group consisting of chromium, iron, cobalt, and nickel, said catalyst systems being capable of catalyzing the exchange of deuterium between said gaseous hydrogen stream and liquid water, said hot tower being maintained at an elevated temperature at which said deuterium is concentrated in the hydrogen stream and said cold tower being maintained at a reduced temperature at which deuterium is concentrated in a liquid water phase;
(b) flowing water, in a closed liquid recirculation loop, (1) downwardly through said cold tower in isotopic exchange relationship with said gaseous hydrogen stream, (2) downwardly through the upper portion of said hot tower in isotopic exchange relationship with said gaseous hydrogen stream, and (3) thereafter recirculating the water to said cold tower;
(c) introducing a feed stream of deuterium-containing water to the top of the lower portion of said hot tower contacting zone for downward flow therethrough in isotopic exchange relationship with said gaseous hydrogen stream, said feed water not contacting water recirculating in said closed loop;
(d) discharging deuterium-depleted water from the bottom of said lower portion of the hot tower to waste; and
(e) removing the fluid stream having an enriched quantity of deuterium isotope therein from between the cold tower and the upper portion of said hot tower contacting zone, whereby the catalyst systems enchance the rate of the hydrogen-water isotopic exchange, the catalyst systems in said cold tower and in the upper portion of the hot tower being isolated from impurities in the feed water, avoiding undue retarding of catalyst activity during the concentration of deuterium at desirable rates in said hydrogen-water isotopic exchange system.

2. The process of claim 1 in which said catalysts are accessible to the gas for isotopic exchange between hydrogen and water vapor, but are substantially inaccessible to liquid water, thereby appreciably retarding catalyst fouling by the liquid water during said hydrogen-water isotopic exchange process, and whereby only the catalyst in the lower portion of the hot tower is contacted by the feed water, the higher operating temperature in said lower portion of the hot tower enhancing the exchange rate and compensating for the lower activity of the catalyst in said lower portion of the hot tower.

3. The process of claim 2 and including (a) passing gaseous hydrogen from said cold tower through a humidification zone, wherein said hydrogen is heated and humidified prior to passage to said lower portion of the hot tower, and (b) passing said hydrogen exiting from the upper portion of the hot tower through a dehumidification zone, wherein said hydrogen is cooled and dehumidified prior to passage to said cold tower.

4. The process of claim 3 in which said water in the closed liquid recirculation loop passes from said cold tower to said dehumidification zone, said water enriched in the deuterium isotope serving to cool and dehumidify the hydrogen gas in said dehumidification zone.

5. The process of claim 4 including passing a portion of the water of said closed liquid recirculation loop exiting from the upper portion of the hot tower to said humidification zone to heat and humidify the circulating hydrogen gas passing through said humidification zone.

6. The process of claim 5 and including returning liquid from said closed loop that is not vaporized in said humidification zone to the closed liquid recirculation loop.

7. The process of claim 6 in which at least one catalyst has a support, said catalyst and support having been treated with polytetrafluoroethylene as said hydrophobic treating material.

8. The process of claim 6 in which at least one catalyst has a support, said catalyst and support having been treated with a silicone resin as said hydrophobic treating material.

9. The process of claim 5 including passing said water withdrawn from the closed liquid recirculation loop to a separation zone to separate catalyst particles therefrom prior to passage of said water to the humidification zone, said catalyst particles being returned for use in said closed loop isotopic exchange process.

10. The process of claim 4 including passing water from downstream separation zones to said closed liquid recirculation loop.

11. The process of claim 4 in which the catalyst in either the cold tower and upper portion of said hot tower or in said lower portion of said hot tower is supported on spaced-apart gas-liquid contacting trays.

12. The process of claim 4 in which the catalyst in either said cold tower and upper portion of said hot tower or in the lower portion of said hot tower is employed as a packed bed of catalyst material.

13. The process of claim 4 in which said catalyst of higher activity comprises a water soluble, homogeneous material that circulates with said water flowing in said closed liquid recirculation loop.

14. The process of claim 4 in which at least one catalyst has a support, said catalyst and support having been treated with polytetrafluoroethylene as said hydrophobic treating material.

15. The process of claim 4 in which at least one catalyst has a support, said catalyst and support having been treated with a silicone resin as said hydrophobic treating material.

16. The process of claim 4 in which said catalyst of higher activity is employed as colloidal size particles in a slurry with said water flowing in said closed liquid recirculation loop.

17. The process of claim 4 including withdrawing a portion of the liquid withdrawn from the dehumidification zone from said closed liquid recirculation loop, cooling said liquid in a heat exchange zone and returning said liquid to the dehumidification zone for said cooling of the hydrogen gas flowing through said dehumidification zone.

18. The process of claim 4 including introducing a stream of hydrogen-containing gas, enriched in deuterium isotope, to the upwardly flowing hydrogen gas stream entering the bottom of said cold tower, said hydrogen-containing gas being returned from downstream processing sections in an amount approximately equal to the mass flow of fluid removed from between the cold tower and the upper portion of the hot tower.

19. The process of claim 4 including introducing a stream of water to the closed liquid recirculation loop between the bottom of the cold tower and the upper portion of said hot tower, said water being introduced in an amount approximately equal to the mass flow of fluid removed therefrom.

20. The process of claim 2 in which said hydrophobic catalyst systems comprise said catalyst material, a porous catalyst support structure and a hydrophobic treating material.

21. The process of claim 20 in which said hydrophobic material comprises polytetrafluoroethylene.

22. The process of claim 2 in which said catalyst is treated with polytetrafluoroethylene as a hydrophobic treating material.

23. The process of claim 2 in which said catalyst is treated with a silicone resin as said hydrophobic material.

* * * * *